(12) United States Patent
Didion et al.

(10) Patent No.: US 6,782,995 B2
(45) Date of Patent: Aug. 31, 2004

(54) TWO-WAY VIBRATORY CONVEYOR AND STABILIZER ROCKER ARM THEREFOR

(75) Inventors: Michael S. Didion, St. Peters, MO (US); Fred T. Chauvin, O'Fallon, MO (US)

(73) Assignee: Precision Components & Assemblies, Inc., St. Peters, MO (US)

( * ) Notice: Subject to any disclaimer, the term of this patent is extended or adjusted under 35 U.S.C. 154(b) by 0 days.

(21) Appl. No.: 10/304,879

(22) Filed: Nov. 27, 2002

(65) Prior Publication Data

US 2003/0226742 A1 Dec. 11, 2003

Related U.S. Application Data

(63) Continuation-in-part of application No. 29/161,893, filed on Jun. 6, 2002, now Pat. No. Des. 479,638.

(51) Int. Cl.[7] .............................................. B65G 25/04
(52) U.S. Cl. .................... 198/750.8; 198/758; 198/763
(58) Field of Search ............................... 198/753, 758, 198/763, 764, 750.8

(56) References Cited

U.S. PATENT DOCUMENTS

| | | | | |
|---|---|---|---|---|
| 1,930,884 A | * | 10/1933 | Pardini | 198/758 |
| 2,299,005 A | * | 10/1942 | Bigelow | 198/758 |
| 3,581,871 A | * | 6/1971 | Forman | 198/764 |
| 3,677,395 A | | 7/1972 | Musschoot | |
| 3,712,459 A | | 1/1973 | Musschoot et al. | |
| 3,750,866 A | | 8/1973 | Musschoot | |
| 4,133,424 A | * | 1/1979 | Sabes | 198/758 |
| 4,152,255 A | | 5/1979 | Musschoot | |
| 4,428,476 A | | 1/1984 | Kraus et al. | |
| 4,611,709 A | | 9/1986 | Kraus et al. | |
| 4,624,370 A | | 11/1986 | Danner et al. | |
| 4,715,950 A | | 12/1987 | Danner et al. | |
| 4,844,235 A | | 7/1989 | Sherman | |
| 4,844,236 A | | 7/1989 | Kraus | |
| 4,979,608 A | * | 12/1990 | Mikata et al. | 198/566 |
| 5,056,652 A | | 10/1991 | Kraus et al. | |
| 5,094,342 A | | 3/1992 | Kraus et al. | |
| 5,131,525 A | | 7/1992 | Musschoot | |
| 5,178,259 A | | 1/1993 | Musschoot | |
| 5,512,008 A | | 4/1996 | Musschoot | |
| 5,591,074 A | | 1/1997 | Musschoot | |
| 5,669,711 A | | 9/1997 | Spence, III et al. | |
| 5,713,457 A | | 2/1998 | Musschoot | |
| 5,850,906 A | * | 12/1998 | Dean | 198/750.8 |
| 5,924,473 A | | 7/1999 | Musschoot | |
| 5,934,446 A | | 8/1999 | Thomson | |
| 5,967,222 A | | 10/1999 | Musschoot et al. | |
| 6,000,644 A | | 12/1999 | Musschoot | |
| 6,029,796 A | | 2/2000 | Musschoot | |
| 6,079,548 A | * | 6/2000 | Svejkovsky et al. | 198/750.8 |
| 6,112,883 A | | 9/2000 | Kraus et al. | |
| 6,155,404 A | | 12/2000 | Musschoot | |
| 6,237,749 B1 | | 5/2001 | Musschoot et al. | |

* cited by examiner

Primary Examiner—James R. Bidwell
(74) Attorney, Agent, or Firm—Paul M. Denk

(57) ABSTRACT

A two-way vibratory conveyor includes at least one trough mounted on a base and a drive which reciprocally moves the trough(s). The conveyor, which in one embodiment has two interconnected troughs and in another embodiment has a single trough, includes a drive which uses a single motor. In the two-trough conveyor, the two troughs are driven in opposite directions. In the single-trough conveyor, the single motor is used to selectively drive the trough in one of two opposite directions. The troughs are mounted to a base using springs and stabilizer arms. The stabilizer arms, which are made of ductile iron, have been found to be withstand larger loads and have a longer useful life than currently available stabilizer arms.

8 Claims, 9 Drawing Sheets

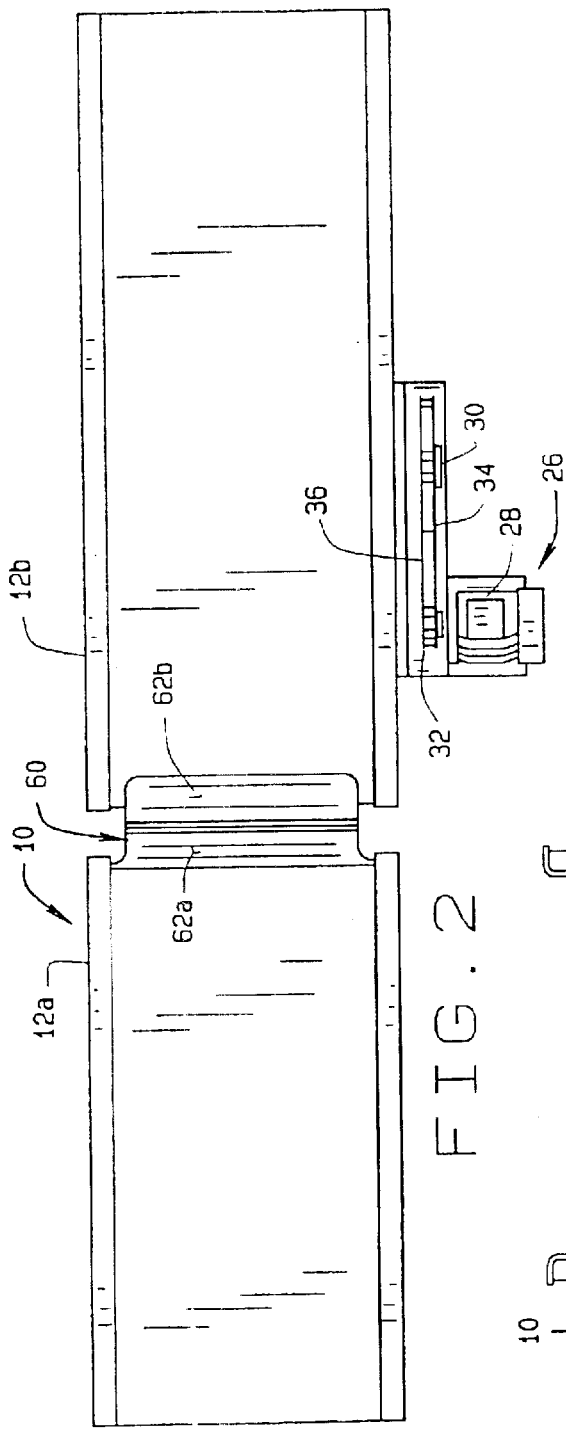
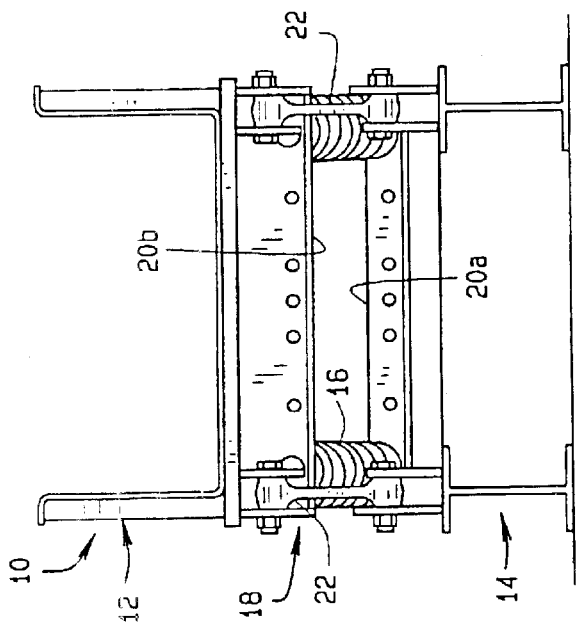

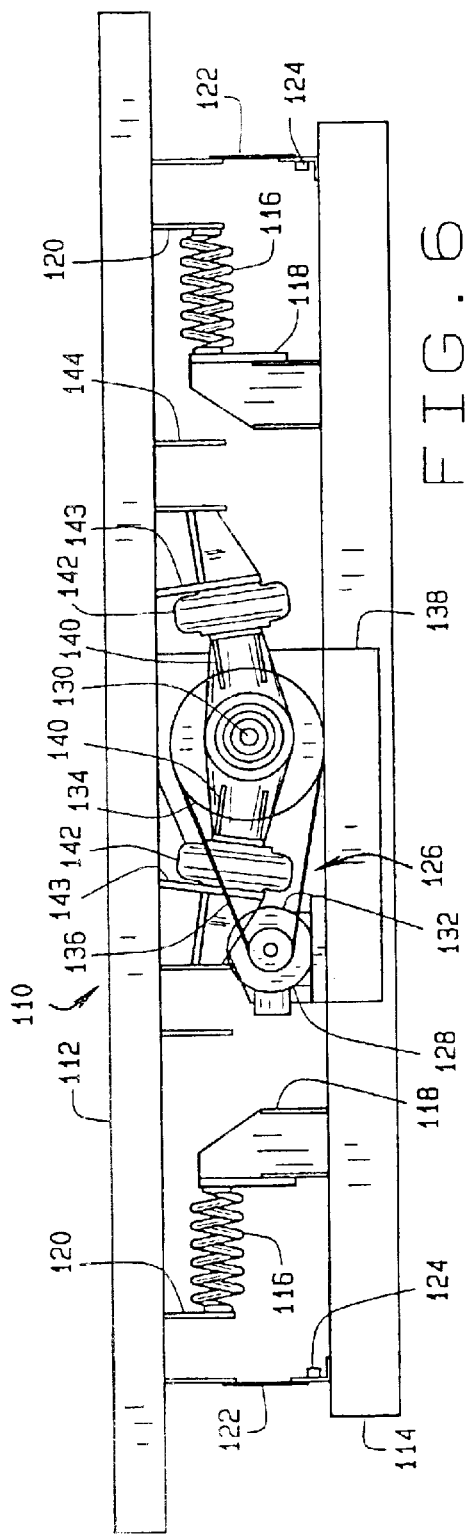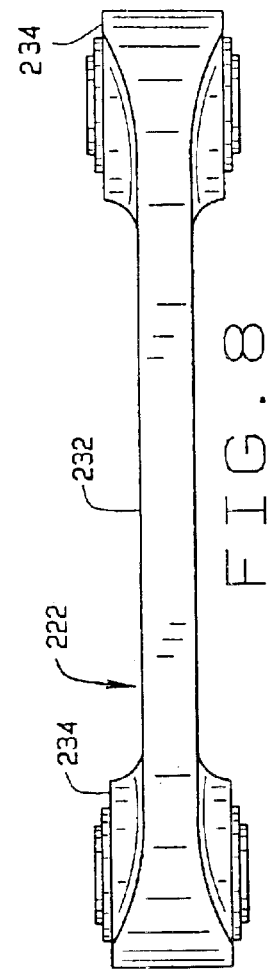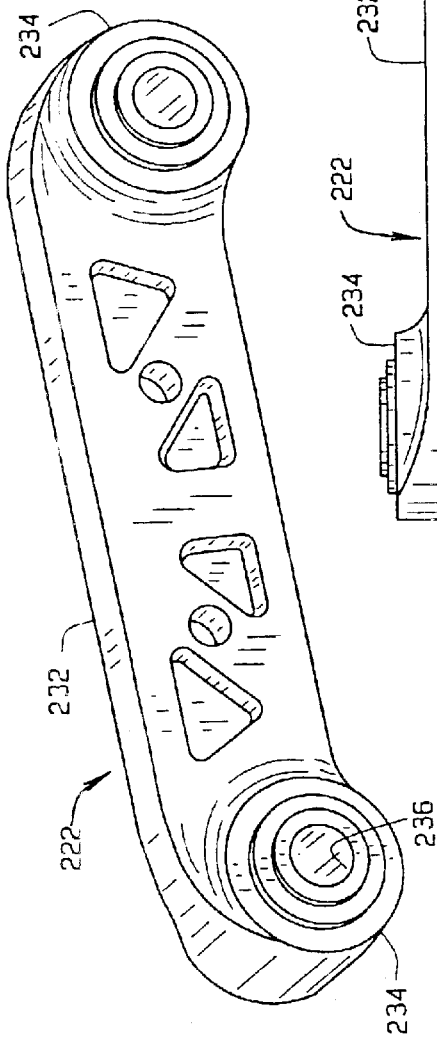

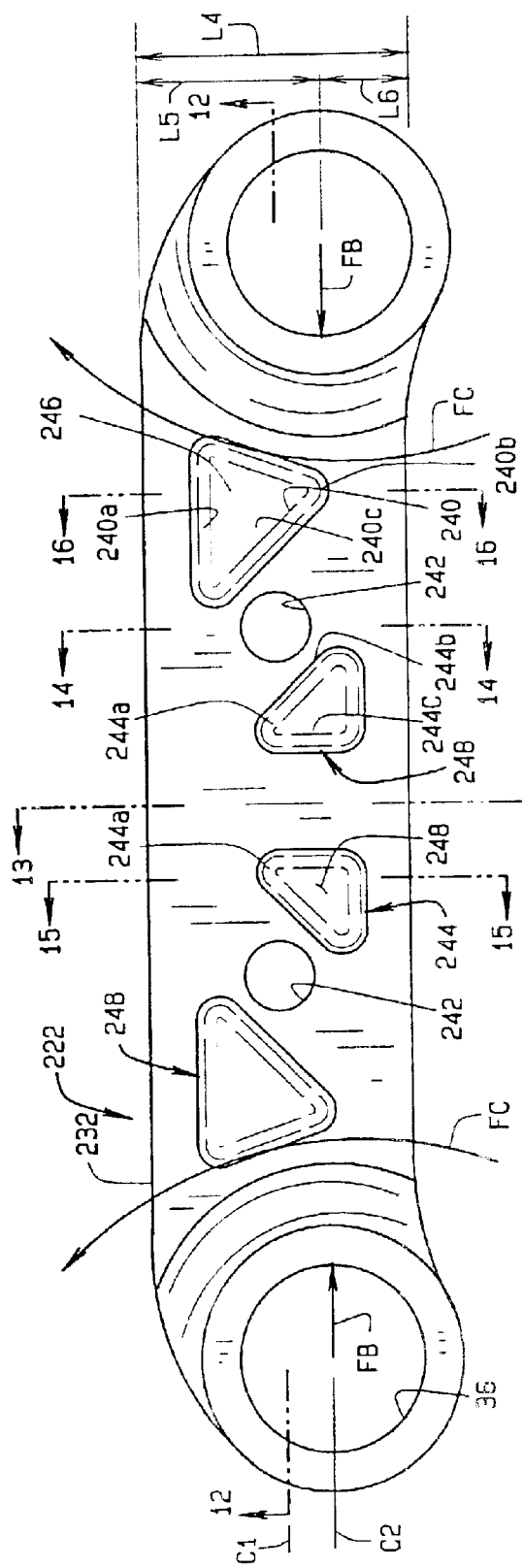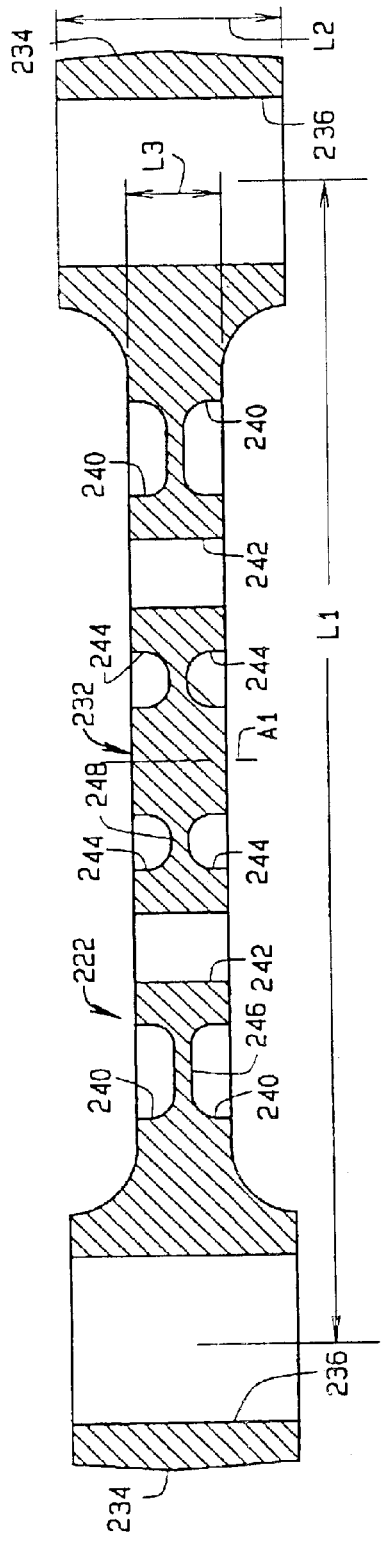
FIG. 11
FIG. 12

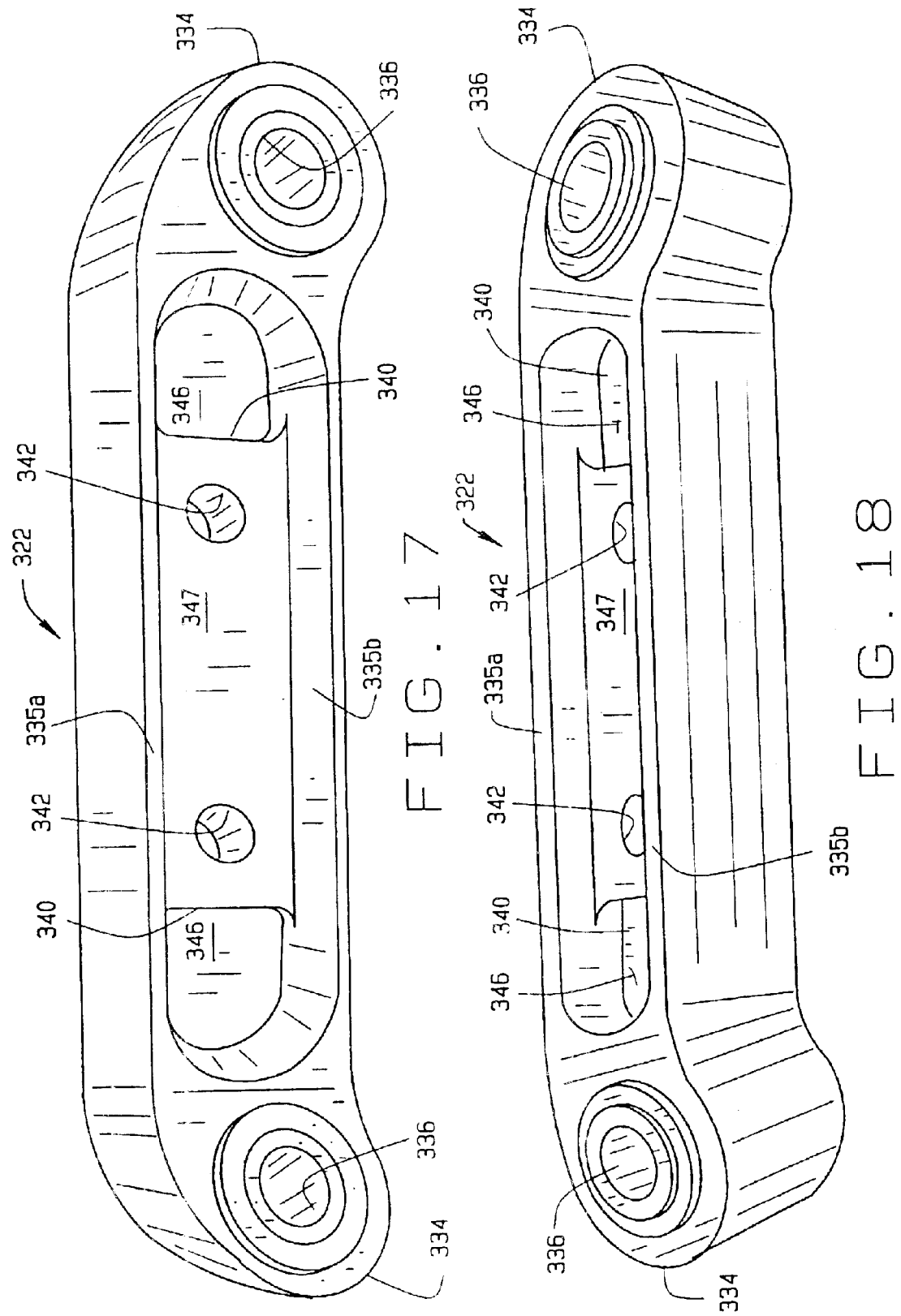

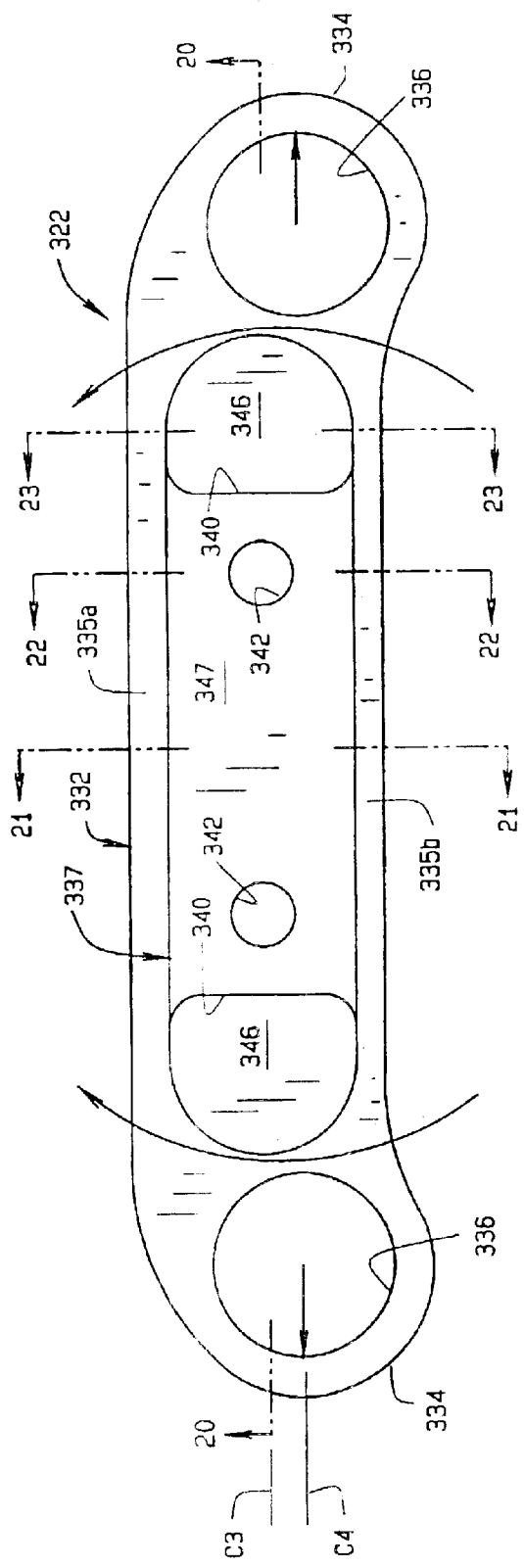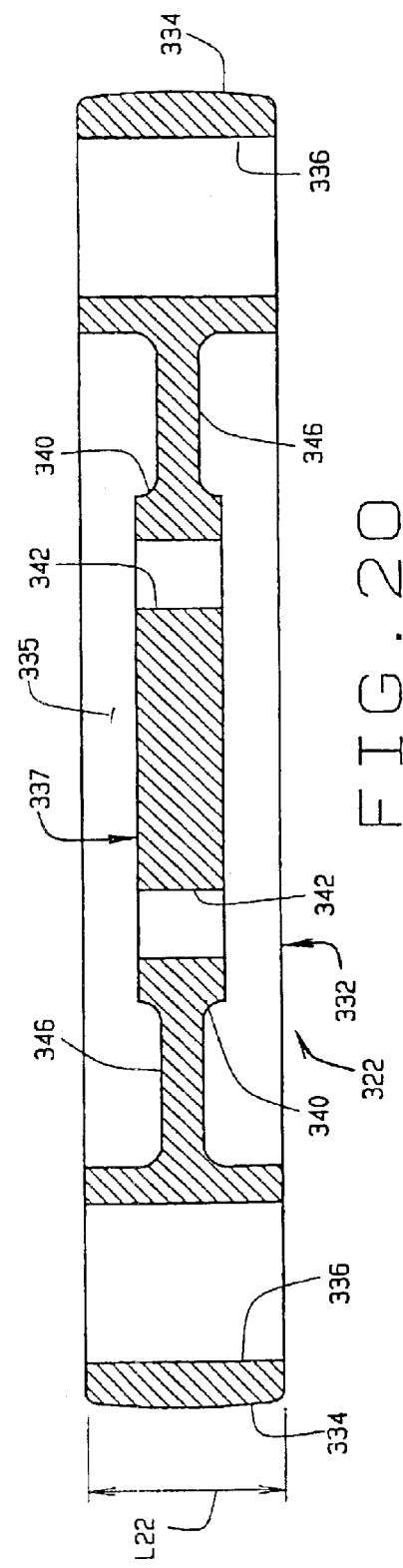

TWO-WAY VIBRATORY CONVEYOR AND STABILIZER ROCKER ARM THEREFOR

CROSS-REFERENCE TO RELATED APPLICATIONS

This is a Continuation-In-Part of application Ser. No. 29/161,893 filed Jun. 6, 2002, now U.S. Pat. No. Des.479,638, entitled Bushing and which is incorporated herein by reference.

STATEMENT REGARDING FEDERALLY SPONSORED RESEARCH OR DEVELOPMENT

Not Applicable.

BACKGROUND OF THE INVENTION

This invention relates to a two-way vibratory conveyor and a stabilizer rocker arm or leg therefor, and, in particular, to such the conveyor which is driven in two directions by a single motor and wherein the stabilizer arm which can withstand a greater load, and have a longer useful life than current stabilizer arms.

Vibratory conveying and feeding equipment or the like, typically include a bed or trough along which product, such as castings, to be treated are passed. The trough is mounted above a base by a plurality of linkages and springs, and a drive is provided to induce vibratory motion to the trough. The troughs are typically large, both in width and in length. Hence, when they are vibrated, and when product is moving along the trough, large vibratory forces can be induced. Stabilizer arms are provided to help stabilize the trough, and to prevent lateral motion, so that the trough is substantially limited to translational movement parallel to the axis of the trough.

It is often desirable to drive two different troughs in opposite directions, or to drive a single trough in two different directions. The former generally requires two motors—one motor for each trough—or a complex double linkage arrangement to drive the two troughs in opposite directions, as well as additional energy to drive the two troughs. In the latter case, where there is a single trough, the conveyor includes complex linkages so that the conveyor can be first driven in one direction, and then driven in an opposite, second direction. It would be desirable to limit the number of motors and provide for simpler linkages to drive a two-trough conveyor or a one-trough conveyor in two opposite directions without the need to change motor rotation.

BRIEF SUMMARY OF THE INVENTION

A two-way vibratory conveyor includes at least one trough mounted on a base and a drive which reciprocally moves the trough(s). In one embodiment of my invention, I have provided a drive which uses a single motor to drive both troughs of a two-trough conveyor. In such a system, the two troughs are axially aligned with each other. The drive includes a single motor, an eccentric shaft rotationally driven by the motor and which extends generally perpendicular to the path of reciprocal motion of the troughs. A cam is operatively connected at one end to the eccentric shaft and at another end to a first trough of the two troughs. A linkage connecting the two troughs together. In operation, the eccentric shaft induces reciprocal motion in the cam, which, in turn, imparts reciprocal motion to the first trough. The reciprocal motion of the first trough induces reciprocal motion in the second trough via the linkage. The linkage has a first leg and a second leg joined at an apex. One of the linkage legs is pivotally connected to the first trough; the other linkage leg is operatively connected to the second trough; and the linkage itself is pivotally mounted to the base at its apex. Thus, as the first leg moves in one direction, the second leg moves in a second opposite direction. Hence, the second trough is moved in a direction opposite from the first trough.

In a second embodiment, the two way conveyor comprises a single trough mounted on a base and a drive which induces reciprocal motion in the trough. In this version, the drive comprises a single motor which drives an eccentric shaft. The eccentric shaft extends perpendicular to the direction of travel of the trough. First and second cams are operatively connected to the eccentric shaft and extend from the shaft in generally opposite directions. An inflatable bladder is operatively connected between the trough and each the cam. The bladder is preferably in the form of an air spring. A controller can be provided which is operable to inflate and deflate the air springs, such that when one of the air springs is inflated, the other air spring is deflated.

The troughs of either conveyer is mounted to the base using springs and rocker or stabilizer arms. The stabilizer arms substantially limit the motion of the trough to reciprocal motion parallel to the elongate axes of the troughs. Stated differently, the stabilizer arms substantially eliminate side-to-side rocking of the troughs. The stabilizer arms of the present invention have unexpectedly been found to be withstand larger loads and have a longer useful life than currently available stabilizer arms.

The stabilizer arm includes a body having a first end, a second end, and a body centerline extending between the first and second ends. Bushings are formed at the first and second ends. The stabilizer arms are made of a ductile iron. The bushings each having a center; and, when a bushing line is drawn through the bushing centers, the bushing line is substantially parallel to, but offset from, the body centerline. Preferably, the bushing line is offset from the center line by a distance approximately 15% of the width of the stabilizer arm.

The stabilizer arm body is defined by a web having a top-to-bottom width less than the axial width of the bushings. The web is symmetrical about an axis generally perpendicular to the body centerline. The web includes at least one indentation and at least one through hole on each side of the line of symmetry. The body indentation includes a pair of opposed indentations, there being an indentation on each major surface of the web.

In one embodiment, the indentations and the through hole are both substantially centered relative to the body centerline. In this embodiment, the opposed indentations (which are preferably D-shaped) are formed at opposite ends of the body web and define first and second outer portions of the web separated by a central portion of the web. The outer portions of the web are thinner than the central portion of the web. The central portion of the web is approximately 2.5 times the width of the outer portions of the web. Additionally, this embodiment includes a wall extending perpendicular to the web and between the bushings.

In another embodiment, the stabilizer arm includes an outer indentation and an inner indentation on each side of the line of symmetry. The inner and outer indentations are on opposite sides of the through hole. Preferably, the inner and outer indentations are approximately equidistant from the through hole on the body center line. The inner and outer indentations are both triangular in shape, and each has an edge which is perpendicular to an edge of the body. Further, the indentations include edges which face each other and are generally parallel to each other. In a preferred configuration, the inner indentation is generally in the shape of a right isosceles triangle, and wherein the outer indentation is an isosceles triangles.

BRIEF DESCRIPTION OF THE SEVERAL VIEWS OF THE DRAWINGS

FIG. 2 is a top plan view of the conveyor;

FIG. 3 is an end elevational view of the conveyor;

FIG. 6 is a cross-sectional view of a two-way conveyor having a single trough;

FIG. 7 is a perspective view of a first illustrative embodiment of a stabilizer rocker arm for use with either of the conveyors;

FIG. 8 is a top plan view of the stabilizer arm;

FIG. 11 is a side elevational view of the stabilizer arm;

FIGS. 12–16 are cross-sectional views of the stabilizer arm taken along lines 12—12, 13—13, 14—14, 15—15, and 16—16 of FIG. 11, respectively;

FIG. 17 is a top perspective view of a second illustrative embodiment of the stabilizer arm of the present invention;

FIG. 18 is a bottom perspective view of the stabilizer arm of FIG. 17;

FIG. 19 is a side elevational view of the stabilizer arm of FIG. 17;

FIGS. 20–23 are cross-sectional views of the stabilizer arm taken along lines 20—20, 21—21, 22—22, and 23—23 of FIG. 19, respectively.

Corresponding reference numerals will be used throughout the several figures of the drawings.

DETAILED DESCRIPTION OF THE INVENTION

Figure 1:
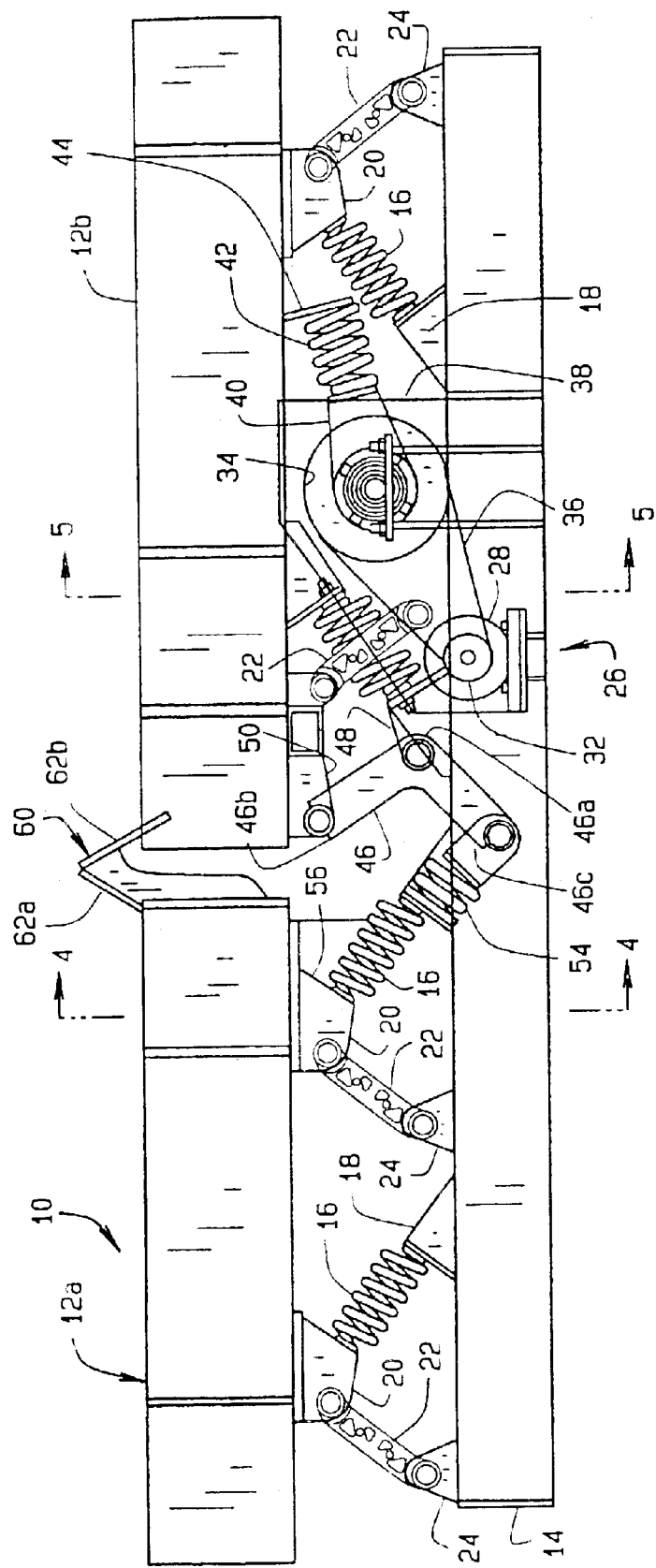
FIG. 1 is a side elevational view of vibratory conveyor of the present invention having two troughs.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 5:
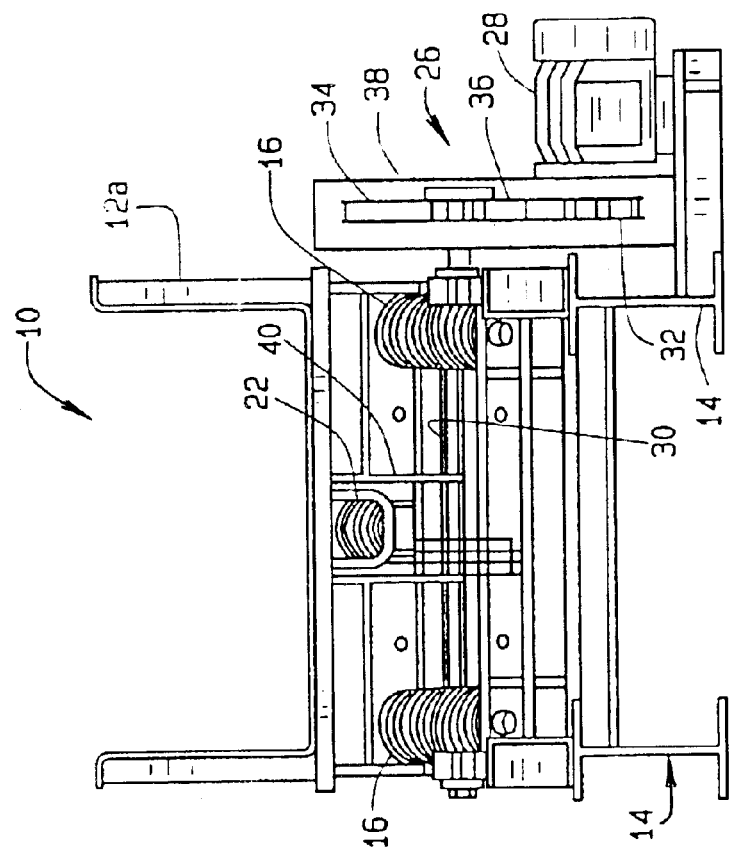
FIG. 5 is a cross-sectional view of the conveyor taken along line 5—5 of FIG. 1.
Figure 4:
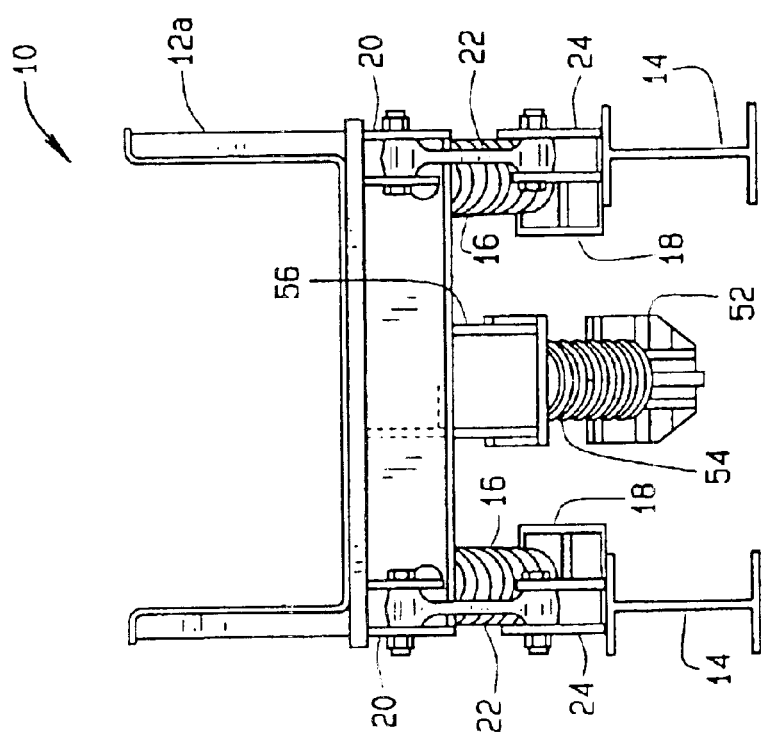
FIG. 4 is a cross-sectional view of the conveyor taken along line 4—4 of FIG. 1.

A piece of vibratory processing equipment such as a vibratory conveyor 10 is shown generally in FIGS. 1 and 2. The conveyor 10 includes a two beds or troughs 12a,b which accept product to be processed. The troughs 12a,b are mounted on a base 14, which as seen in FIGS. 3–5, comprises a pair of spaced apart I-beams. The troughs 12a,b are mounted to the base 14 to allow the troughs to move axially relative to the base 14. To enable this, a plurality of springs 16 extend between the troughs and the base. Preferably, each trough has four springs 16, there being two spaced apart springs 16 near the front of the troughs and two spaced apart springs 16 near the back of at the troughs. The springs 16 each extend between a base mounted bracket 18 and a trough mounted bracket 20. Although the troughs 12a,b are shown to be axially aligned with each other, it will be apparent that the troughs could also be arranged such that one trough is an upper trough and the other is a lower trough.

A stabilizer arm 22 also extends between the troughs and the base. There are four stabilizer arms shown for each trough, there being one stabilizer arm associated with each spring 16. The stabilizer arms are connected at their top ends to the trough brackets 20, and at their bottom ends to the base stabilizer brackets 24. As best seen in FIG. 1, the stabilizer arms 22 and springs 16 both extend diagonally between the troughs and the base. However, the stabilizer arms 22 and springs 16 extend from the troughs to the base in opposite directions. That is, for a spring 16 that extends from left to right, the corresponding stabilizer arm 22 extends from right to left.

A drive 26 is operable to reciprocally move the troughs forwardly and rearwardly to induce vibratory motion in the troughs. The springs 16 serve to isolate the troughs 12a,b from the base 14 to substantially reduce, or eliminate, the transfer of vibratory forces from the troughs to the base 14 (and to the floor on which the conveyor sits). The stabilizer arms 22 maintain the troughs in axial alignment with each other, and substantially prevent the troughs from moving perpendicularly to their elongate axis. That is, the stabilizer arms 22 substantially prevent sideways motion of the troughs.

The drive 26 (shown in FIGS. 1, 2, and 5) includes a motor 28 which drives an eccentric shaft 30. To drive the shaft 30, pulleys 32 and 34 can be fixed to the motor output shaft and the eccentric shaft 30, respectively, and a pulley belt 36 can extend around the two pulleys. The eccentric shaft 30 can be driven in other manners as well. For example, a chain and sprockets could replace the belt and pulleys. Alternatively, the motor 28 could directly drive the eccentric shaft 30. A guard or housing 38 can cover at least the outer side of the pulleys and belt.

Figure 10:
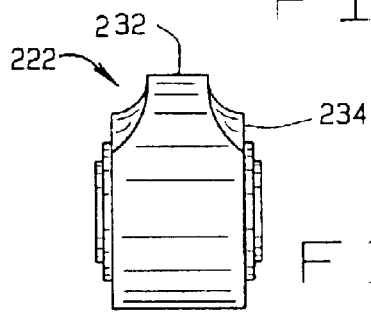
FIG. 10 is an end elevational view of the stabilizer arm.
Figure 13:
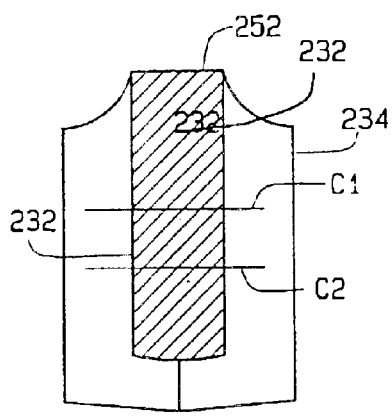

A cam 40 (FIG. 10 is operatively connected to the eccentric shaft 30, such that the cam 40 will reciprocate as the shaft 30 rotates. A drive spring 42 extends from an end of the cam 40 and is connected to the bottom of the trough 12b via a plate 44. Hence, as can be appreciated, as the shaft 30 rotates, the cam 40 reciprocates axially (or from left to right, with reference to FIG. 1). This reciprocal motion is passed to the trough by means of the drive spring 42 to induce reciprocal, vibratory motion in the trough 12b.

The troughs 12a and 12b are spaced apart from each other along their longitudinal axes. A connecting pivot arm 46 is used to operatively connect trough 12a to trough 12b, such that reciprocal motion will be induced in trough 12a by the motion of trough 12b. The pivot arm 46 is shaped generally like a sideways V (or a boomerang), that is, its apex 46a is vertically between the ends 46b,c of the legs. The pivot arm 46 is pivotally connected to the base 14 at its apex 46a by means of a bracket 48. The top leg is pivotally connected at its end 46b to the trough 12b at the forward end of the trough 12b by means of a bracket 50. The bottom end of the pivot arm 46 is pivotally connected to a bracket 52. The bracket 52, in turn, is operatively connected to the trough 12a by means of a slave drive spring 54. A spring bracket 56 (FIG. 4) is mounted to the underside of the trough 12a, and the spring 54 is connected to this bracket.

As can be appreciated, as the trough 12b reciprocates, the connecting stabilizer arm 46 will pivot, inducing a forward and rearward motion in the stabilizer arm bottom end 46c. This reciprocal motion of the stabilizer arm bottom end 46c is transferred to the trough 12a by means of the slave drive spring 54 to induce reciprocal, vibratory motion in the trough 12a. When the top end 46b of the pivot arm moves forwardly, the bottom end 46c of the pivot arm moves rearwardly, and vice versa. Thus, the troughs 12a,b will reciprocate in opposite directions—they will move forward and away from each other. Stated, differently, as one moves to the left (with reference to FIG. 1), the other will move to the right, and vice versa.

A divider 60 is mounted to the right end of trough 12a (with reference to FIG. 1). The divider includes two sloped surface 62a,b which are connected at an apex. Surface 62a leads into trough 12a and surface 62b leads into trough 12b. The surface 62b, as can be seen, overhangs the end of the trough 12b to account for the opposite reciprocal motion of the two troughs. The surface 62b is sized so that no matter the separation between the two troughs during the relative motion of the two toughs, the surface 62b will always overhang the right end of the trough (with reference to FIG. 1) and lead into the trough 12b.

In operation, a feed chute would be located above the divider 60, and material to be processed would be deposited on the divider 60. Some of the material would slide down surface 62a into trough 12a and some would slide down surface 62b into trough 12b. The two troughs would then convey the material to their opposite ends, where the material would be delivered to additional processing equipment.

A second two-way vibratory conveyor 110 is shown in FIG. 6. The conveyor 110 is a single trough, rather than a two-trough, conveyor. The trough 112 is mounted on a base 114 which, like the base 14, comprises a pair of spaced apart I-beams. The trough 112 is mounted to the base 114 to allow the troughs to move axially relative to the base 114. To enable this, a plurality of springs 116 are operatively connected at one end to the trough and at another end to the base. Preferably, there are four springs 116, there being two spaced apart springs 116 near the front of the trough and two spaced apart springs 116 near the back of at the trough. The springs 116 each extend between a base mounted bracket 118 and a trough mounted bracket 120. As seen in FIG. 6, the brackets 118 and 120 are sized and positioned so that the springs 116 extend generally horizontally, rather than diagonally, as do the springs 16 of conveyor 10.

A stabilizer arm 122 also extends between the trough and the base. The stabilizer arm 122 is identical to the stabilizer arm 22, and is described below in more detail. There are four stabilizer arms for the trough 112, there being one stabilizer arm associated with each spring 116. The stabilizer arms are connected at their top ends to the trough brackets 120, and at their bottom ends to the base stabilizer brackets 124. When the trough 112 is centered over the base 114, as seen in FIG. 6, the stabilizer arms 122 extend generally vertically.

A drive 126 is operable to reciprocally move the trough forwardly and rearwardly to induce vibratory motion in the trough. The springs 116 serve to isolate the trough 112 from the base 114 to substantially reduce, or eliminate, the transfer of vibratory forces from the troughs to the base 114 (and to the floor on which the conveyor sits). The stabilizer arms 122 maintain the troughs in axial alignment with each other, and substantially prevent the troughs from moving perpendicularly to their elongate axis. That is, the stabilizer arms 122 substantially prevent sideways motion in the troughs.

The drive 126 includes a motor 128 which drives an eccentric shaft 130. To drive the shaft 130, pulleys 132 and 134 can be fixed to the motor output shaft and the eccentric shaft 130, respectively, and a pulley belt 136 can extend around the two pulleys. The eccentric shaft 130 can be driven in other manners as well. For example, a chain and sprockets could replace the belt and pulleys. Alternatively, the motor 128 could directly drive the eccentric shaft 130. A guard or housing 138 can cover at least the outer side of the pulleys and belt.

A pair of cams 140 are operatively connected to the eccentric shaft 130, such that the cams 140 will reciprocate as the shaft 130 rotates. The cams 140 are operatively connected to the shaft 130 to extend from the shaft 130 in opposite directions. Hence, as the shaft 130 is rotated, the cams 140 will reciprocate relative to the base. An inflatable/deflatable bladder 142, preferably in the form of an air spring, is mounted to the end of each cam 140 on one side of the springs 142. The air springs 142 are connected to a bracket 143 on a side of the air springs opposite of the cams 140. The bracket 143 is connected to the underside of the trough. As seen, there are left and right cams 140 and air springs 142. The trough is operated with one spring inflated and the other deflated. For example, (with reference to FIG. 6) when the left air spring is inflated and the right air spring is deflated, the reciprocal motion of the left cam will be passed through the left spring 142 to the bracket 143 to induce reciprocal motion in one direction to the trough. The right air spring, when deflated, will act as a lost motion connection between the right cam 140 and the bracket 143, and the reciprocal motion of the right cam will not affect the motion of the trough. Conversely, when the right air spring is inflated and the left air spring is deflated (again with reference to FIG. 6), the reciprocal motion of the right cam will be passed through to the trough to induce reciprocal vibratory motion in the trough in an opposite direction. In operation, when the left air spring is inflated and the right air spring deflated, the drive will stroke to the right to move material to the right; and when the right air spring is inflated and the left air spring is deflated, the drive will stroke to the left to move material to the left.

Because the direction in which the material is driven along the trough 112 depends on inflating and deflating the two air springs, the conveyor 110 includes a pneumatic system (not shown) which is operable to selectively inflate and deflate the air springs. By operating the trough to move material to the right, the pneumatic system would inflate the left air spring and deflate the right air spring. Conversely, when the conveyor is operated to move material to the left, the pneumatic system would inflate the right air spring and deflate the left air spring. The pneumatic system preferably is not operable to simultaneously inflate or simultaneously deflate both air springs.

A first illustrative embodiment of the stabilizer arm 222 which is used with the conveyors is shown generally in FIGS. 7–11 and in more detail in FIGS. 12–16. The stabilizer arm 222 includes a body 232 having a center line C1 which extends through the body 232. A bushing 234 is formed at each end of the body 232. The bushing 234 includes a journal 236 through which an axle can extend to pivotably mount the stabilizer arm 222 to its respective brackets on the trough and base. The centers of the journals are co-linear and lie on a line C2 which is spaced below, and substantially parallel to, the centerline C1 of the stabilizer arm body 232. To provide a smooth transition between the body 232 and the bushings 234, the upper and lower surfaces of the body are curved, at the opposite ends of the body, where the stabilizer arm body is joined to the stabilizer arm bushings.

For a unit having trough 82½" long, 18" high, and 36" wide, the stabilizer arms 222 have a length L1 of about 14" between the centers of the bushing journals 236; the bushings have a width L2 of about 2¾"; the body 232 has a width L3 of about 1⅛" and a height L4 of about 3⅜". As noted above, the bushings are lowered with respect to the body. Hence, in this preferred embodiment, the distance L5 from the center of the bushing to the top of the body is about 2⁵⁄₁₆" and the distance L6 from the center of the bushing to the bottom of the body is about 1¹⁄₁₆".

The stabilizer arm 222 is symmetrical about its vertical axis A1. As seen, each half of the stabilizer arm 222 includes a pair of outer indentations 240, a through hole 242, and a pair of inner indentations 244. The indentations 240 and 244 both extend inwardly from opposite side surfaces of the body, and the indentations of each pair of indentations are separated by a wall 246 and 248, respectively. As seen best in FIG. 11, the indentations 240 and 244 are both generally triangular indentations. The indentations 244 generally form right triangles, with the triangles of opposite halves of the body 232 facing away from each other, and the corner 244a of the indentation wall 248 being on the body center line C1. The indentations 240 are generally isosceles triangles, but are off-set, such that one side 240a of the two sides of the triangle which are of equal length is generally parallel to the top edge of the body 252. The indentations 240 pass through the centerline C1, with the bottom corner 240b of the indentation 240 being on the centerline C2. The two indentations are positioned and angled such that the hypotenuse 244b of the indentation 244 and the side 240c of the indentation 240 are generally parallel to each other. As seen best in FIGS. 15 and 16, the junction between the walls and floor of the indentations 240 and 244 is not sharp. Rather, there is a curved junction between the walls and floors of the indentations 240 and 244. Hence, as seen in FIG. 11, the perimeter of the indentations 240 and 244 at the surface of the stabilizer arm is greater than the perimeter of the indentation at the walls (or floors) 246 and 248 which separate the pairs of indentations. The through hole 242 is positioned approximately midway between the two indentations 240 and 244, and is positioned such that it has a diameter which lies on the centerline C1.

Figure 14:
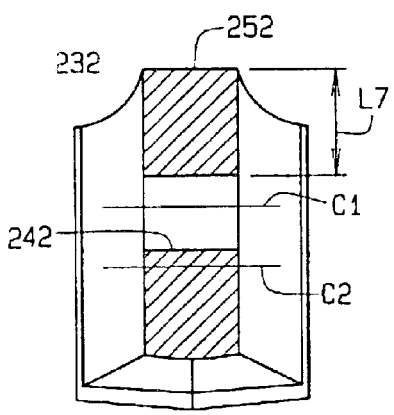

The through bore 242 is shown in vertical cross-section in FIG. 14. In this preferred embodiment, the through bore 242 has a diameter of about ⅞". It is centered relative to the centerline C1, as noted above. Hence, the margins above and below the bore 242 are equal, and preferably have a length L7 of about 1¼".

Figure 15:
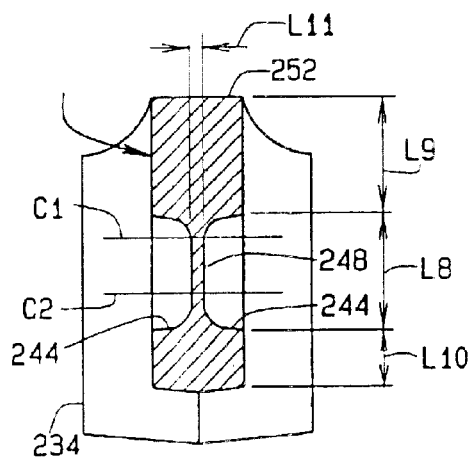

The inner indentations 244 are shown in vertical cross-section in FIG. 15. The vertical leg 244c of the indentations has a length L8, at the surface of the stabilizer arm, of about 1⁵⁄₁₆". As noted above, the indentation 244 is not centered relative to the stabilizer arm body. Hence, the margins above and below the indentations 244 are not equal. Preferably, for this preferred embodiment, the margin above the leg, at the surface, has a length L9 of about 1⁷⁄₁₆", and the margin below the leg has a length L10 of about ¹¹⁄₁₆". The wall 248 which separates the indentations on opposite sides of the stabilizer arm has a width L11 of about ³⁄₁₆". As noted above, the stabilizer arm has a width of about 1⅛". Hence, the indentations, which are identical, each have a depth of about ¹⁵⁄₃₂".

Figure 16:
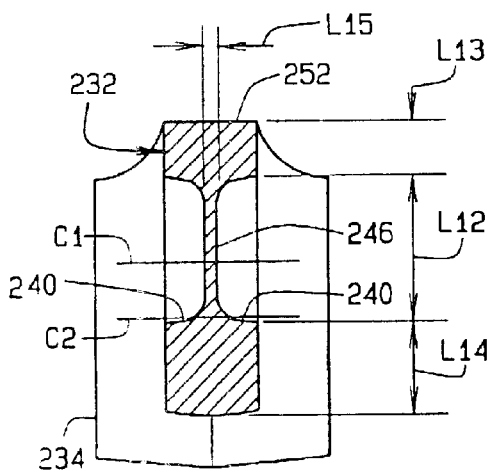

The inner indentations 240 are shown in vertical cross-section in FIG. 16. The indentations 240, at their greatest dimension, have a length L12, at the surface of the stabilizer arm, of about 1¹¹⁄₁₆". As noted above, the indentation 240 is not centered relative to the stabilizer arm body. Hence, the margins above and below the indentations 240 are not equal. Preferably, for this preferred embodiment, the margin above the leg, at the surface, has a length L13 of about ¹¹⁄₁₆", and the margin below the leg has a length L14 of about 1¹⁄₁₆". The wall 246 which separates the indentations on opposite sides of the stabilizer arm has a width L15 of about ³⁄₁₆". As noted above, the stabilizer arm has a width of about 1⅛". Hence, the indentations, which are identical, each have a depth of about ¹⁵⁄₃₂".

Figure 24:
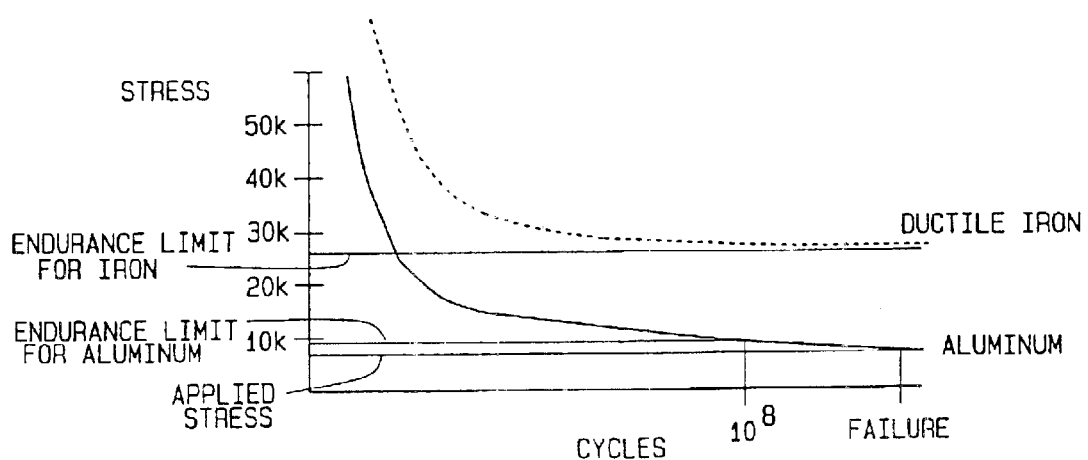
FIG. 24 is a graph comparing the endurance limits of stabilizer arms made from aluminum and ductile iron.

The stabilizer arm 222 is preferably made of ductile iron. The composition along with the configuration of the stabilizer arm gives the stabilizer arm many unforeseen advantages over currently used stabilizer arms which are made of aluminum. First, the stabilizer arm is easier to install and replace, saving time because it is flangeless. If it becomes loose or misaligned, the erosion which may be caused at mating surface of the bushing is minimized. Secondly, it is designed in such a way as to minimize the total weight of the part. This is important on vibratory equipment, because this minimizes the mass inertia reaction forces surrounding the part on the connecting conveyor pieces. Thirdly, the stabilizer arm is made from 65000 or 100000 psi tensile strength ductile iron. Currently available aluminum parts are manufactured from 356 aluminum. Aluminum is a material which does not have a well-defined endurance limit. A rule of thumb for determining the endurance limit is 0.3 times the tensile strength. The endurance limit is taken as the stress that will cause failure at $10^8$ or $5 \times 10^8$ applications of stress. A conveyor operating at 900 cpm may undergo this range of cycles within one year. Ductile cast iron greatly increases the fatigue life of the part. The rule of thumb for endurance limit of cast iron is 0.4 times the tensile strength. Additionally, the ductile material will yield around discontinuities, thus reducing stress. For example, for a typical cast aluminum part which may have a tensile strength of 30000 psi, the endurance strength would be about 9000 psi. On the other hand, a cast iron part of 65000 psi tensile strength would have an endurance limit of 26000 psi and the 100000 psi tensile strength ductile iron would have an endurance limit of about 40000 psi. This is presented by a big shift in the fatigue curve, as seen in FIG. 24. A ductile iron part could have 2–4 times as much stress and still outlast the aluminum part.

During operation of the conveyor units 10 or 110, the stabilizer arms 222 will be subject to a bending force or stress FB and a centric force or stress FC (FIG. 11). The bending force is a compressive force which, as seen in FIG. 11, extends along a vector generally co-linear with the line C2, and which places the top edge 52 of the stabilizer arm in tension. The total force or stress (FT) is add together on the bottom edge, and negate each other. The forces FB and FC are shown by the equations below:

Let $FB = M^*y/\text{Inertia}$, $FC = FT/\text{area}$.

When the centerline C2 through the bushings 234 is the axis of origin, y=2¹⁵⁄₁₆" at the top surface of the stabilizer arm and y=−1⁹⁄₁₆" at the bottom surface of the stabilizer arm.

Then CB=0 when y=centroid and CB<0 when y<0.

Let total stress FT=FB−FC. Then the stresses will differ at the top surface and add at the bottom surface. Thus, for example, where:

| | |
|---|---|
| the eccentric load | F = 1000 lbs; |
| area | A = 3.7067 in$^2$; |
| centroid | C = 0.625" above the centerline C2; |
| inertia | I = 3.5027 in$^4$; and |
| Y | Y = 2.3125" |

The moment M is equal to the eccentric load times the distance from the point of application to the centroid (or center of mass). Thus, for the above example, M=F*C=1000 lbs*0.625"=625 in-lbs;

FB=(M*(Y−C))/I=(1000 lbs*(2.3125"−0.625"))/2.3125 in$^4$=301 psi;

FC=F/A=1000 lbs/3.7067 in$^2$=265.908 psi;

FT=FB−FC=301−265.9097=35.199 psi.

ST can also be written as $$F * \left(\left(\frac{C*Y - C^2}{I}\right) - \frac{1}{A}\right).$$

Figure 9:
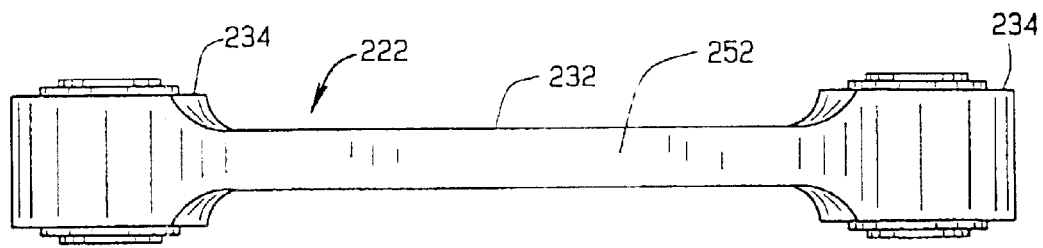
FIG. 9 is a bottom plan view of the stabilizer arm.

Thus, if F=1000 lbs, the total stress can be ratioed. For the cross-sections of FIGS. 13–16, the total stress is determined using the following numbers:

| | Cross-Section | | | |
|---|---|---|---|---|
| | FIG. 9 | FIG. 10 | FIG. 11 | FIG. 12 |
| Force (lbs) | 1000.000 | 1000.000 | 1000.000 | 1000.000 |
| Area (in$^2$) | 3.7067 | 2.776 | 2.606 | 2.255 |
| Centroid (in) | 0.625 | 0.625 | 0.791 | 0.500 |
| Inertia (in$^4$) | 3.503 | 3.440 | 3.122 | 3.090 |
| I$_A$ (what is I$_A$?) | 4.972 | 4.524 | 4.753 | 3.653 |
| Momentum (F*C) | 625.000 | 625.000 | 791.100 | 499.700 |
| Bending Force at top (y = 2 5/16") | 301.107 | 306.604 | 385.491 | 293.157 |
| Bending Force at bottom (y = −1 9/16") | −390.324 | −397.450 | −596.353 | −333.489 |
| Centric Force (FC) | 265.908 | 360.179 | 383.715 | 446.557 |
| FT (psi) at top (y = 2 5/16") | 35.199 | −53.575 | 21.776 | −150.400 |
| FT (psi) at bottom (y = −1 9/16") | −656.232 | −757.628 | −980.068 | −777.046 |

A second illustrative embodiment of the stabilizer arm is shown in FIGS. 17–23. The stabilizer arm 322 has the same basic foot print as does the stabilizer arm 222. The stabilizer arm 322 includes a body 332 having a center line C3 which extends through the body 332. A bushing 334 is formed at each end of the body 332. The bushing 334 includes a journal 336 through which an axle can extend to pivotably mount the stabilizer arm 322 to the brackets of the trough and base. The centers of the journals are co-linear and lie on a line C4 which is spaced below, and is substantially parallel to, the centerline C3 of the stabilizer arm body 332. To provide a smooth transition between the body 332 and the bushings 334, the upper and lower surfaces of the body are curved, at the opposite ends of the body, where the stabilizer arm body is joined to the stabilizer arm bushings.

The body 332 comprises side walls 335a,b which extend between the two bushings 332 along the top and bottom of the and a web 337 which extends between the two bushings 332 and the side walls 335a,b. As can be seen in FIG. 19, the side wall 335a is preferably slightly wider than the side wall 335b. In a preferred embodiment, wherein the stabilizer arm as a length of about 14" between the centers of the bushing journals 336, and a width of about 3⅜" from the outer surfaces of the side walls, the side wall 335a has a width of about ½" and the side wall 335b has a width of about ⅜".

As with the stabilizer arm 222, in the stabilizer arm 322, the distance from the center of the bushing to the top of the body is preferably about 2 5/16" and the distance from the center of the bushing to the bottom of the body is about 1 1/16".

The stabilizer arm 322 is symmetrical about its vertical axis A1' (FIG. 20). As seen, each half of the stabilizer arm 322 includes a pair of outer indentations 340 and a through hole 342. The indentations 340 extend inwardly from opposite side surfaces of the web 337 and are separated by a wall 346. As seen best in FIG. 19, the indentations 340 are preferably D-shaped, and face away from each other. As further seen in FIG. 23, the indentations 340 provide a narrow outer section to the web, which is defined by the wall 346 which separates the opposing indentations 340. The central section 347 of the web 337 preferably has a width of about 1¼" and the walls 346 preferably have a width of about ½". Both the indentations 340 and the through holes 342 are centered on the centerline C3 of the stabilizer arm body 332. The through holes 342 preferably have a diameter of about ⅞"

During operation of the conveyor 10 or 110, the stabilizer arms 322 will be subject to a bending force or stress FB and a centric force or stress FC (FIG. 19). The bending force is a tensile force, as seen in FIG. 19, which places the top edge of the stabilizer arm in compression. The total force or stress (FT) is add together on the bottom edge, and negate each other. The forces are determined in the same manner as set forth in the equations above.

Figure 21:
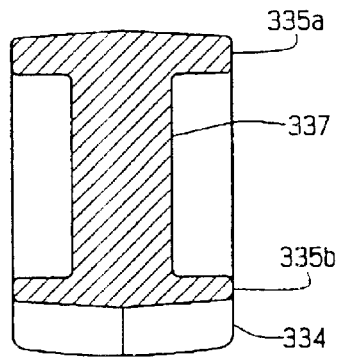
Figure 22:
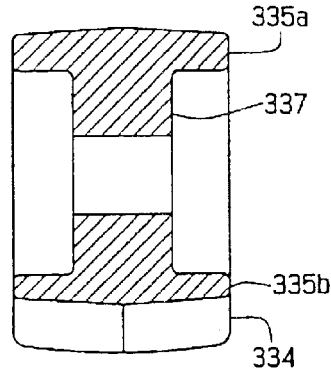
Figure 23:
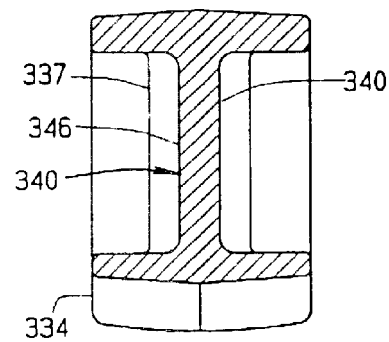

For the cross-sections of FIGS. 21–23, assuming a force of 1,000 lbs, the total stress is determined using the following numbers:

| | Cross-Section | | |
|---|---|---|---|
| | FIG. 17 | FIG. 18 | FIG. 19 |
| Force (lbs) | 1000.000 | 1000.000 | 1000.000 |
| Area (in$^2$) | 5.330 | 4.236 | 3.455 |
| Centroid (in) | 0.669 | 0.697 | 0.727 |
| Inertia (in$^4$) | 6.276 | 6.190 | 5.266 |
| I$_{AA}$ = I + Ad$^2$ (what are I$_{AA}$ and Ad?) | 8.661 | 8.245 | 7.091 |
| Momentum (F*C) | 669.000 | 696.500 | 726.800 |
| Bending Force (FB) at top (y = 2 5/16") | 175.205 | 181.827 | 218.846 |
| Bending Force (FB) at bottom (y = − 1 9/16") | −237.889 | −254.175 | −315.951 |
| Centric Force (FC) | 187.617 | 236.049 | 289.427 |
| FT (psi) at top (y = 2 5/16") | −12.412 | −54.223 | −70.581 |
| FT (psi) at bottom (y = −1 9/16") | −425.506 | −490.224 | −605.379 |

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense.

What is claimed is:

1. A two-way vibratory conveyor, said conveyor including:
  a first trough and a second trough; said troughs being operatively mounted to a base for reciprocal, translational motion relative to said base;
  a drive which induces reciprocal motion in both said troughs; said drive including: a single motor, an eccentric shaft rotationally driven by said motor and extending generally perpendicular to the path of translational motion of said troughs; a cam operatively connected at one end to said eccentric shaft and at another end to said first trough; and,
  a linkage connecting said first and second troughs, said linkage has a first leg and a second leg joined at an apex, one of said first and second legs being pivotally connected to said first trough, and the other of said first and second legs being operatively connected to said second trough, and said linkage being pivotally mounted to said base at its said apex;
  whereby said rotation of said eccentric shaft induces reciprocal motion in said cam to impart reciprocal motion in said first trough, as said first leg moves in one direction, said second leg moves in a second opposite direction thus, said second trough is moved in a direction opposite from said first trough via said linkage.

2. The two-way conveyor of claim 1 wherein a drive spring is operatively connected at one end to said cam and at another end is operatively mounted to said first trough; and wherein a slave spring is operatively connected at one end to said linkage second leg and at a second end is operatively connected to said second trough.

3. The two-way conveyor of claim 1 wherein said troughs are operatively mounted to said base at least in part with a stabilizer arm; the stabilizer arm including a body having a first end, a second end, and a body centerline extending between said first and second ends; and a bushing at said first and second ends; said bushings each having a center, wherein, when a bushing line is drawn through said bushing centers, said bushing line is substantially parallel to, but offset from, said body centerline.

4. A two way conveyor comprising a trough mounted on a base and a drive which induces reciprocal motion in said trough; said drive comprising:
  a motor;
  an eccentric shaft extending perpendicular to the direction of travel of said trough;
  first and second cams operatively connected to said eccentric shaft and extending from said shaft in generally opposite directions; and
  an inflatable bladder operatively connected between said trough and each said cam.

5. The two-way conveyor of claim 4 including a controller which is operable to inflate and deflate said bladders; whereby, when one of said bladders is inflated, the other bladder is deflated.

6. The two-way conveyor of claim 4 wherein said bladder is an air spring.

7. The two-way conveyor of claim 4 wherein said trough is operatively mounted to said base at least in part with a stabilizer arm; the stabilizer arm including a body having a first end, a second end, and a body centerline extending between said first and second ends; and a bushing at said first and second ends; said bushings each having a center, wherein, when a bushing line is drawn through said bushing centers, said bushing line is substantially parallel to, but offset from, said body centerline.

8. A two-way vibratory conveyor, said conveyor including:
  a first trough and a second trough; said troughs being operatively mounted to a base for reciprocal, translational motion relative to said base;
  a drive which induces reciprocal motion in both said troughs; said drive including: a single motor, an eccentric shaft rotationally driven by said motor and extending generally perpendicular to the path of translational motion of said first trough; a cam operatively connected at one end to said eccentric shaft and at another end to said first trough; a linkage connecting said first and second troughs; and, one or more springs operatively connected between said linkage and said first trough and said second trough; whereby said rotation of said eccentric shaft induces reciprocal motion in said cam to impart reciprocal motion in said first trough; said first trough inducing reciprocal motion in said second trough via said linkage.

* * * * *